(12) United States Patent
Millington et al.

(10) Patent No.: US 9,947,316 B2
(45) Date of Patent: Apr. 17, 2018

(54) VOICE CONTROL OF A MEDIA PLAYBACK SYSTEM

(71) Applicant: SONOS, INC., Santa Barbara, CA (US)

(72) Inventors: Nicholas A. J. Millington, Santa Barbara, CA (US); Keith Corbin, Boston, MA (US); Mark Plagge, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/223,218

(22) Filed: Jul. 29, 2016

(65) Prior Publication Data

US 2017/0243576 A1    Aug. 24, 2017

Related U.S. Application Data

(60) Provisional application No. 62/312,350, filed on Mar. 23, 2016, provisional application No. 62/298,418, (Continued)

(51) Int. Cl.
| | |
|---|---|
| *G10L 21/00* | (2013.01) |
| *G10L 15/18* | (2013.01) |
| *G10L 15/30* | (2013.01) |
| *G06F 3/16* | (2006.01) |
| *H04R 27/00* | (2006.01) |
| *G10L 25/00* | (2013.01) |
| *G10L 15/08* | (2006.01) |
| *G10L 15/22* | (2006.01) |

(52) U.S. Cl.
CPC .......... *G10L 15/1822* (2013.01); *G06F 3/165* (2013.01); *G10L 15/30* (2013.01); *H04R 27/00* (2013.01); *G10L 2015/088* (2013.01);

*G10L 2015/223* (2013.01); *H04R 2227/003* (2013.01); *H04R 2227/005* (2013.01)

(58) Field of Classification Search
CPC ................ G10L 15/1822; G10L 15/30; G10L 2015/223; G10L 2015/088; G06F 3/165; H04R 27/00; H04F 2227/003
USPC .......................... 704/246, 251, 252, 270, 275
See application file for complete search history.

(56) References Cited

U.S. PATENT DOCUMENTS

| | | |
|---|---|---|
| 4,941,187 A | 7/1990 | Slater |
| 5,440,644 A | 8/1995 | Farinelli et al. |
| | (Continued) | |

FOREIGN PATENT DOCUMENTS

| | | |
|---|---|---|
| AU | 2017100486 A4 | 6/2017 |
| AU | 2017100581 A4 | 6/2017 |
| | (Continued) | |

OTHER PUBLICATIONS

US 9,299,346, 03/2016, Hart et al. (withdrawn)
(Continued)

*Primary Examiner* — Thierry L Pham

(57) ABSTRACT

A voice input comprising a command word, one or more media variable instances, and one or more zone variable instances is received. A media playback system command which corresponds to the command word is determined. Media content which corresponds to the one or more media variable instances is identified. The media playback system is caused to execute the media playback system command on the media content based on the one or more zone variable instances.

20 Claims, 8 Drawing Sheets

Related U.S. Application Data filed on Feb. 22, 2016, provisional application No. 62/298,425, filed on Feb. 22, 2016, provisional application No. 62/298,350, filed on Feb. 22, 2016, provisional application No. 62/298,388, filed on Feb. 22, 2016.

(56) References Cited

U.S. PATENT DOCUMENTS

| | | |
|---|---|---|
| 5,740,260 A | 4/1998 | Odom |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,702,508 B2 | 4/2010 | Bennett |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,983,844 B1 | 3/2015 | Thomas et al. |
| 9,042,556 B2 | 5/2015 | Kallai et al. |
| 9,215,545 B2 | 12/2015 | Dublin et al. |
| 9,251,793 B2 | 2/2016 | Lebeau et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,412,392 B2 | 8/2016 | Lindahl et al. |
| 9,426,567 B2 | 8/2016 | Lee et al. |
| 9,431,021 B1 * | 8/2016 | Scalise ............... G10L 21/00 |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2007/0018844 A1 | 1/2007 | Sutardja |
| 2007/0019815 A1 | 1/2007 | Asada et al. |
| 2007/0076131 A1 | 4/2007 | Li et al. |
| 2007/0140058 A1 | 6/2007 | McIntosh et al. |
| 2007/0142944 A1 | 6/2007 | Goldberg et al. |
| 2008/0248797 A1 | 10/2008 | Freeman et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0238377 A1 | 9/2009 | Ramakrishnan et al. |
| 2009/0326949 A1 | 12/2009 | Douthitt et al. |
| 2010/0023638 A1 | 1/2010 | Bowman |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0145581 A1 | 6/2011 | Malhotra et al. |
| 2011/0280422 A1 | 11/2011 | Neumeyer et al. |
| 2011/0299706 A1 | 12/2011 | Sakai |
| 2012/0177215 A1 | 7/2012 | Bose et al. |
| 2012/0297284 A1 | 11/2012 | Matthews, III et al. |
| 2013/0006453 A1 | 1/2013 | Wang et al. |
| 2013/0066453 A1 | 3/2013 | Seefeldt |
| 2013/0148821 A1 | 6/2013 | Sorensen |
| 2013/0183944 A1 | 7/2013 | Mozer et al. |
| 2013/0191122 A1 | 7/2013 | Mason |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0343567 A1 | 12/2013 | Triplett et al. |
| 2014/0006026 A1 | 1/2014 | Lamb et al. |
| 2014/0075306 A1 | 3/2014 | Rega |
| 2014/0094151 A1 | 4/2014 | Klappert et al. |

(56) References Cited

U.S. PATENT DOCUMENTS

| | | |
|---|---|---|
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0258292 A1 | 9/2014 | Thramann et al. |
| 2014/0274185 A1 | 9/2014 | Luna et al. |
| 2014/0363022 A1 | 12/2014 | Dizon et al. |
| 2015/0016642 A1 | 1/2015 | Walsh et al. |
| 2015/0086034 A1 | 3/2015 | Lombardi et al. |
| 2015/0154976 A1 | 6/2015 | Mutagi |
| 2015/0180432 A1 | 6/2015 | Gao et al. |
| 2015/0200454 A1 | 7/2015 | Heusdens et al. |
| 2015/0228274 A1 | 8/2015 | Leppänen et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0077710 A1 | 3/2016 | Lewis et al. |
| 2016/0093304 A1 | 3/2016 | Kim et al. |
| 2016/0098393 A1 | 4/2016 | Hebert |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0125037 A1 | 5/2017 | Shin |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0236512 A1 | 8/2017 | Williams et al. |

FOREIGN PATENT DOCUMENTS

| | | |
|---|---|---|
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016033364 A1 | 3/2016 |
| WO | 2017039632 A1 | 3/2017 |

OTHER PUBLICATIONS

Non-Final Office Action dated Dec. 12, 2016, issued in connection with U.S. Appl. No. 15/098,718, filed Apr. 14, 2016, 11 pages.

Non-Final Office Action dated Jan. 13, 2017, issued in connection with U.S. Appl. No. 15/098,805, filed Apr. 14, 2016, 11 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo" Analog Stereo Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

UPnP; "Universal Plug and Play Device Architecture," Jun. 8, 2000; version 1.0; Microsoft Corporation; pp. 1-54.

"Denon 2003-2004 Product Catalog," Denon, 2003-2004, 44 pages.

Corrected Notice of Allowability dated Mar. 8, 2017, issued in connection with U.S. Appl. No. 15/229,855, filed Aug. 5, 2016, 6 pages.

Final Office Action dated Aug. 11, 2017, issued in connection with U.S. Appl. No. 15/131,776, filed Apr. 18, 2016, 7 pages.

Final Office Action dated Jun. 15, 2017, issued in connection with U.S. Appl. No. 15/098,718, filed Apr. 14, 2016, 15 pages.

International Searching Authority, International Search Report and Written Opinion dated May 23, 2017, issued in connection with International Application No. PCT/US2017/018739, Filed on Feb. 21, 2017, 10 pages.

International Searching Authority, International Search Report and Written Opinion dated May 30, 2017, issued in connection with International Application No. PCT/US2017/018728, Filed on Feb. 21, 2017, 11 pages.

Non-Final Office Action dated Feb. 7, 2017, issued in connection with U.S. Appl. No. 15/131,244, filed Apr. 18, 2016, 12 pages.

Non-Final Office Action dated Feb. 8, 2017, issued in connection with U.S. Appl. No. 15/098,892, filed Apr. 14, 2016, 17 pages.

(56) References Cited

OTHER PUBLICATIONS

Non-Final Office Action dated Mar. 9, 2017, issued in connection with U.S. Appl. No. 15/098,760, filed Apr. 14, 2016, 13 pages.
Non-Final Office Action dated Sep. 14, 2017, issued in connection with U.S. Appl. No. 15/178,180, filed Jun. 9, 2016, 16 pages.
Non-Final Office Action dated Apr. 19, 2017, issued in connection with U.S. Appl. No. 15/131,776, filed Apr. 18, 2016, 12 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Jun. 30, 2017, issued in connection with U.S. Appl. No. 15/277,810, filed Sep. 27, 2016, 13 pages.
Non-Final Office Action dated Sep. 6, 2017, issued in connection with U.S. Appl. No. 15/131,254, filed Apr. 18, 2016, 13 pages.
Notice of Allowance dated Jul. 12, 2017, issued in connection with U.S. Appl. No. 15/098,805, filed Apr. 14, 2016, 8 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Aug. 22, 2017, issued in connection with U.S. Appl. No. 15/273,679, filed Sep. 22, 2016, 5 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
Morales-Cordovilla et al. "Room Localization for Distant Speech Recognition," Proceedings of Interspeech 2014, Sep. 14, 2014, 4 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Oct. 26, 2017, issued in connection with U.S. Appl. No. 15/438,744, filed Feb. 21, 2017, 12 pages.
Tsiami et al. "Experiments in acoustic source localization using sparse arrays in adverse indoors environments", 2014 22nd European Signal Processing Conference, Sep. 1, 2014, 5 pages.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.

* cited by examiner

VOICE CONTROL OF A MEDIA PLAYBACK SYSTEM

CROSS-REFERENCE

This application claims the benefit of priority under 35 USC § 119(e) to U.S. Provisional Application Ser. No. 62/312,350 filed on Mar. 23, 2016 and entitled "VOICE CONTROL OF A MEDIA PLAYBACK SYSTEM", U.S. Provisional Application Ser. No. 62/298,418 filed on Feb. 22, 2016 and entitled "AUDIO RESPONSE PLAYBACK", U.S. Provisional Application Ser. No. 62/298,425 filed on Feb. 22, 2016 and entitled "MUSIC SERVICE SELECTION", U.S. Provisional Application Ser. No. 62/298,350 filed on Feb. 22, 2016 and entitled "METADATA EXCHANGE INVOLVING A NETWORKED PLAYBACK SYSTEM AND A NETWORKED MICROPHONE SYSTEM", and U.S. Provisional Application Ser. No. 62/298,388 filed on Feb. 22, 2016 and entitled "HANDLING OF LOSS OF PAIRING BETWEEN NETWORKED DEVICES", the contents each of which are herein incorporated by reference in their entireties.

This application is also related to U.S. Provisional Application Ser. No. 62/298,410 filed on Feb. 22, 2016 and entitled "DEFAULT PLAYBACK DEVICE(S)", U.S. Provisional Application Ser. No. 62/298,433 filed on Feb. 22, 2016 and entitled "ROOM-CORRECTED VOICE DETECTION", U.S. Provisional Application Ser. No. 62/298,439 filed on Feb. 22, 2016 and entitled "CONTENT MIXING", and U.S. Provisional Application Ser. No. 62/298,393 filed on Feb. 22, 2016 and entitled "ACTION BASED ON USER ID", the contents each of which are herein incorporated by reference in their entireties.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
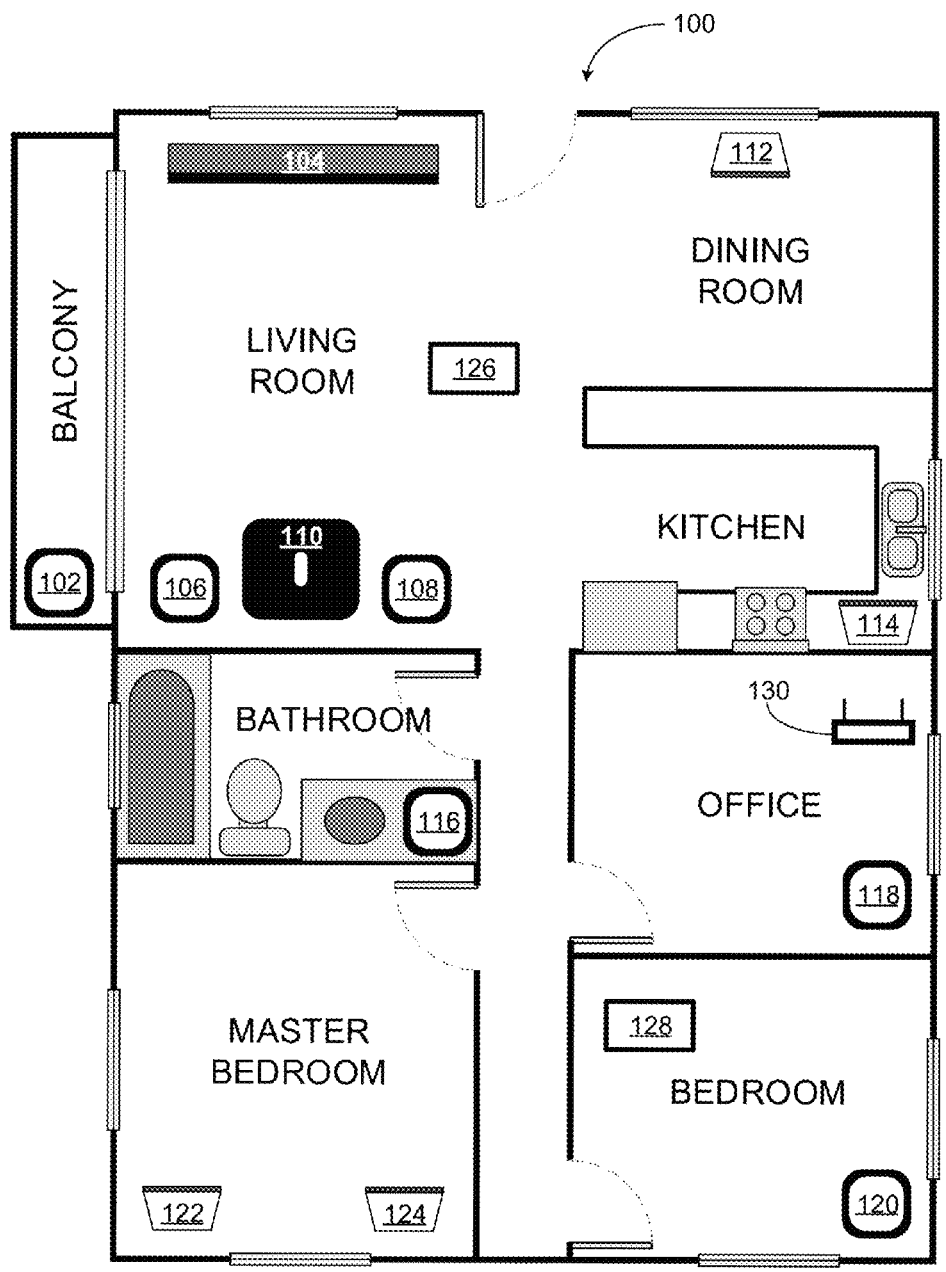
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve controlling a media playback system via voice input. As indicated above, the examples provided herein involve a method. The method may include receiving a voice input that includes a command word and one or more media variable instances and determining that the voice input corresponds to music control. The method may further involve determining a command that corresponds to the command word and processing the voice input to identify a media playback system command corresponding to the intent. The voice input may be processed to identify media content related to the one or more music variable instances, and one or more media items of the media content may be determined. The media playback system may be caused to execute the command on the one or more media items.

In another aspect, a non-transitory computer-readable medium is provided. The non-transitory computer readable medium has stored thereon instructions executable by a computing device to cause the computing device to perform functions. The functions include receiving a voice input that includes a command word and one or more media variable instances and determining that the voice input corresponds to music control. The functions may further involve determining a command that corresponds to the command word and processing the voice input to identify a media playback system command corresponding to the intent. The voice input may be processed to identify media content related to the one or more music variable instances, and one or more media items of the media content may be determined. The media playback system may be caused to execute the command on the one or more media items.

In yet another aspect, a system is provided. The apparatus includes a processor and a memory. The memory has stored thereon instructions executable by the apparatus to cause the system to perform functions. The functions include receiving a voice input that includes a command word and one or more media variable instances and determining that the voice input corresponds to music control. The functions may further involve determining a command that corresponds to the command word and processing the voice input to identify a media playback system command corresponding to the intent. The voice input may be processed to identify media content related to the one or more music variable instances, and one or more media items of the media content may be determined. The media playback system may be caused to execute the command on the one or more media items.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
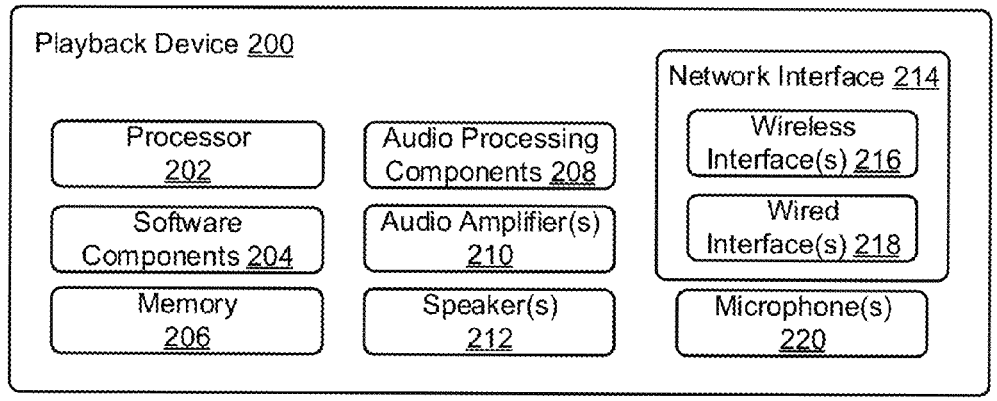
FIG. 2 shows a functional block diagram of an example playback device according to aspects described herein.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
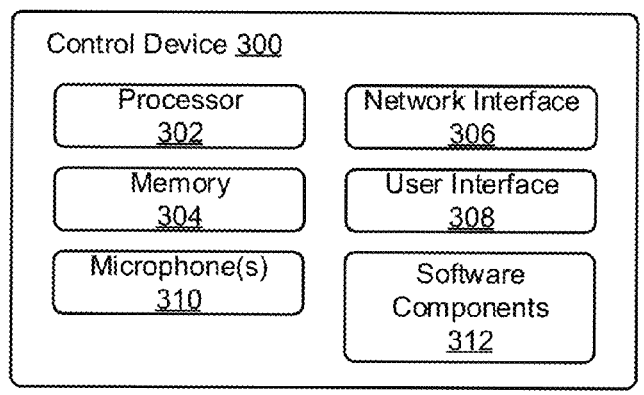
FIG. 3 shows a functional block diagram of an example control device according to aspects described herein.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
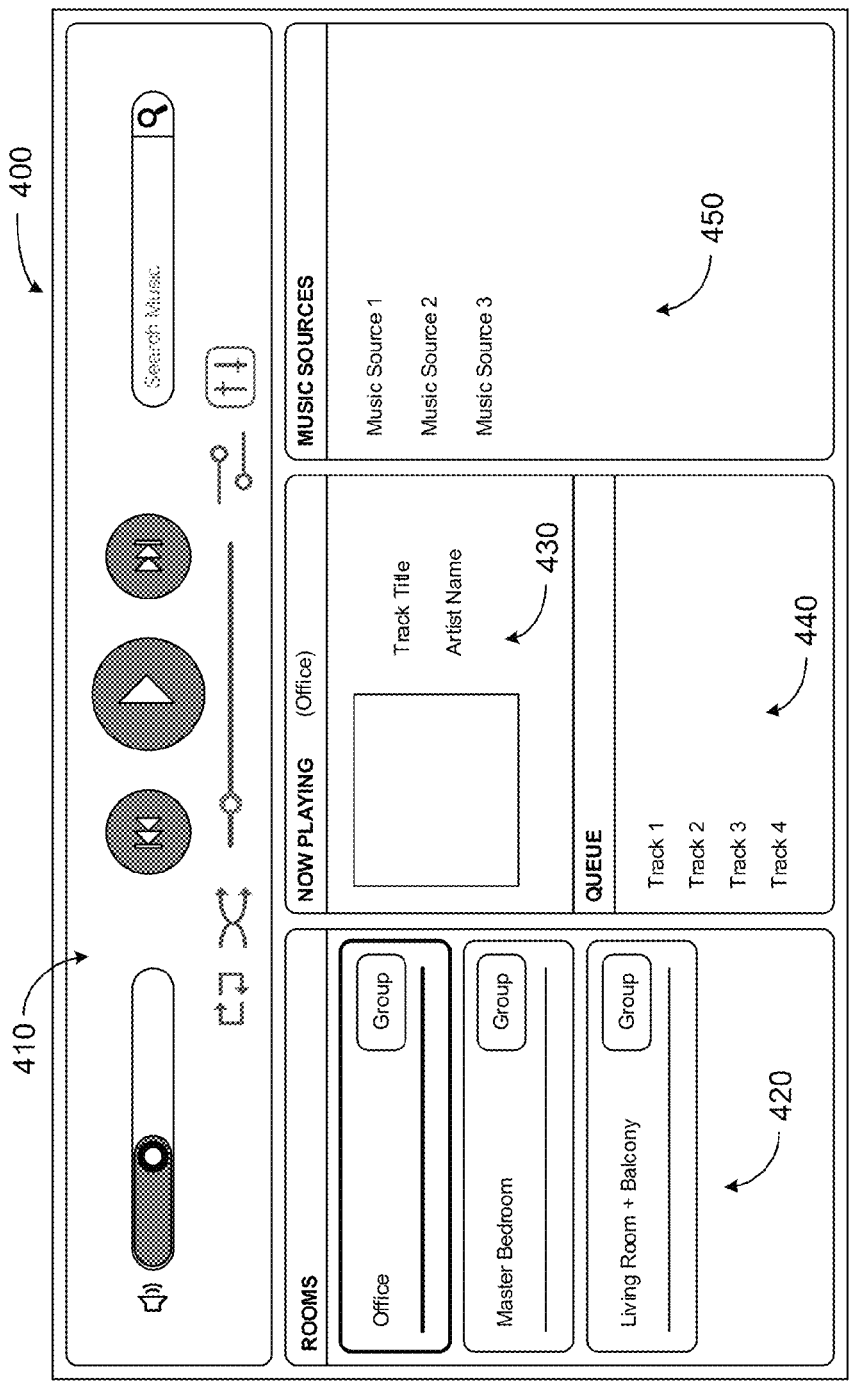
FIG. 4 shows an example controller interface according to aspects described herein.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
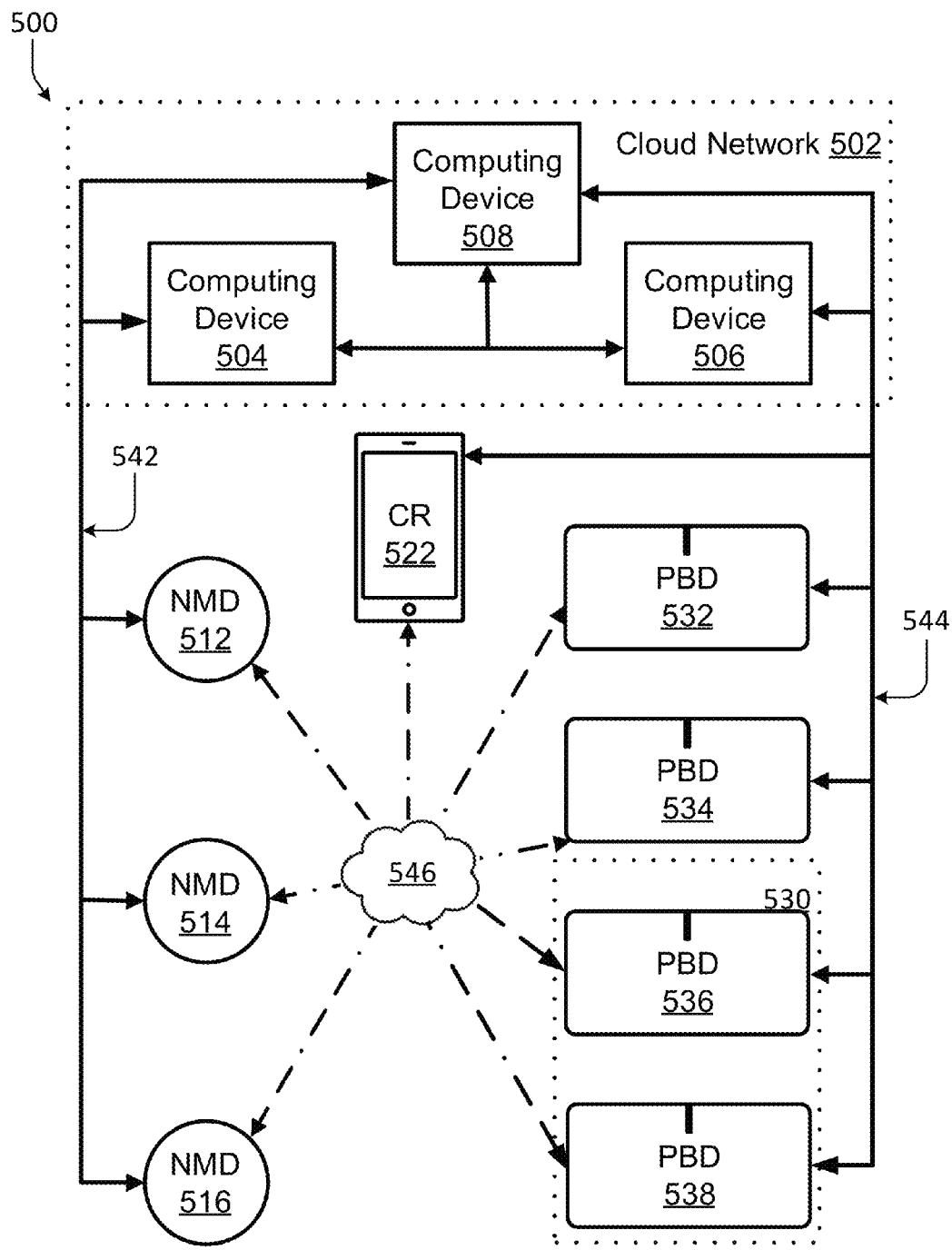
FIG. 5 shows an example plurality of network devices according to aspects described herein.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

In yet another example, the computing device 504 may perform some processing to identify the relevant command or intent of the user and provide information regarding media content relevant to the voice input to the computing device 506. For example, the computing device 504 may perform the speech-to-text conversion of the voice input and analyze the voice input for a command or intent (e.g., play, pause, stop, volume up, volume down, skip, next, group, ungroup) along with other information about how to execute the command. The computing device 504 or the computing device 506 may determine what PBD commands correspond to the command or intent determined by the computing device 504. The command or intent determined from the voice input and/or other information related to executing the command may be transmitted from the computing device 504 to the computing device 506. The processing on the computing device 504 may be performed by an application, a module, add-on software, an integration with the native networked microphone system software platform, and/or the native networked microphone system software platform.

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
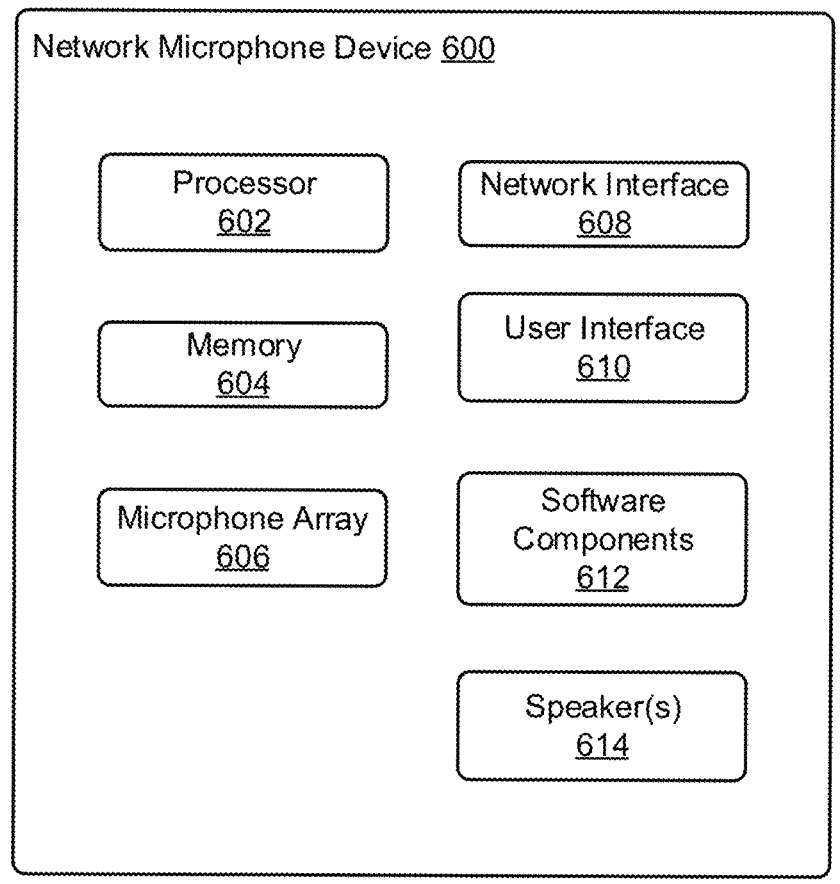
FIG. 6 shows a function block diagram of an example network microphone device according to aspects described herein.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

iii. Example Method and System for Voice Control of a Media Playback System

Figure 7:
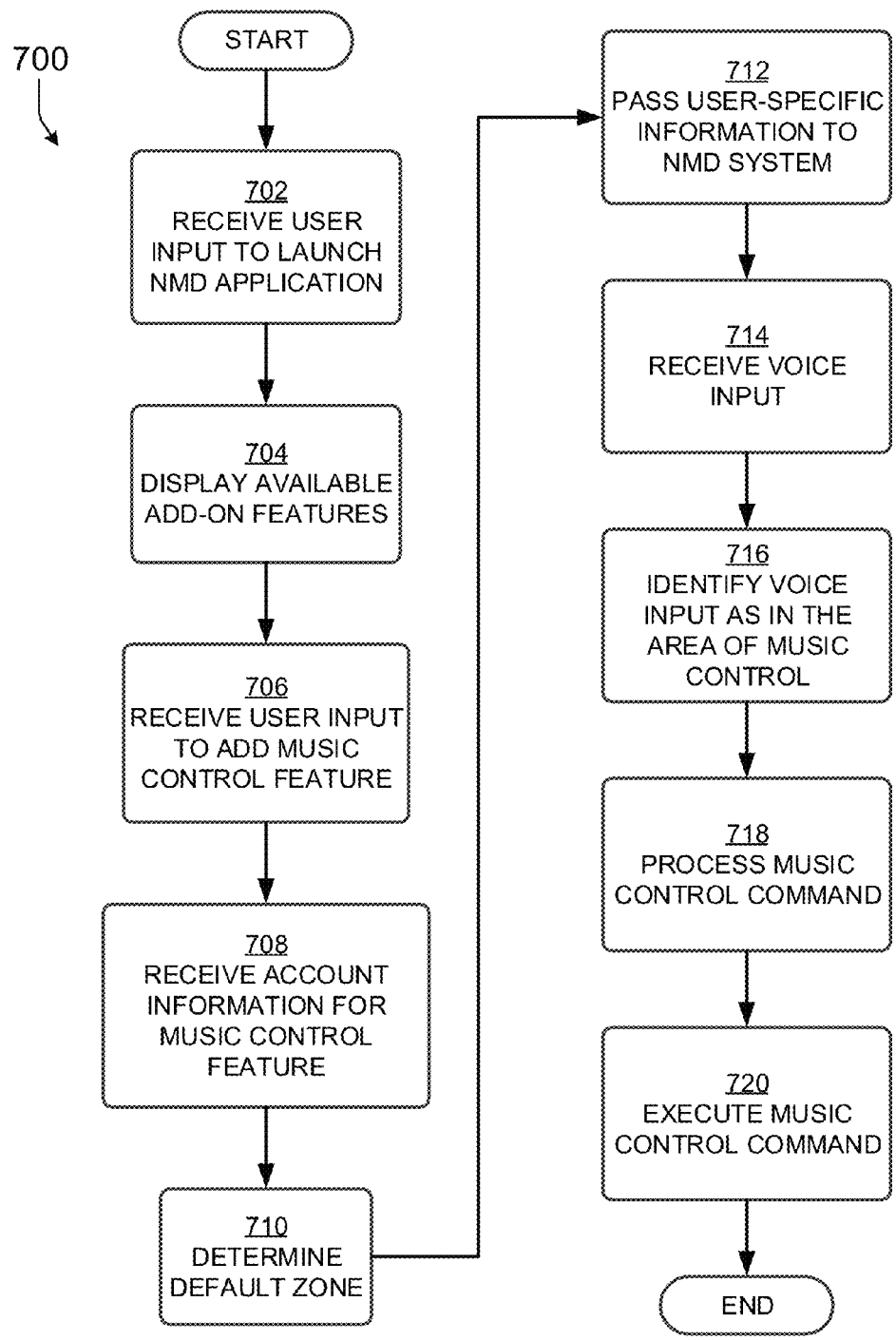
FIG. 7 shows a flow diagram of an example method of music control according to aspects described herein.

As discussed above, embodiments described herein may involve controlling a media playback system. FIG. 7 shows an example flow diagram 700 of a method for playing an audio response. Method 700 presents an embodiment of a method that can be implemented within an operating environment involving, for example, the media playback system 100 of FIG. 1, one or more of the playback device 200 of FIG. 2, one or more of the control device 300 of FIG. 3, and one or more of the plurality of devices in system 500 of FIG. 5. Method 700 may involve transmitting and receiving information between a networked microphone system and the media playback system via various communication paths as described herein and/or using a metadata exchange channel as described in Application No. 62/298,350 filed Feb. 22, 2016 and entitled "Metadata exchange involving a networked playback system and a networked microphone system." This application is hereby incorporated by reference in its entirety. Method 700 may include one or more operations, functions, or actions. Although the blocks in FIG. 7 are illustrated in sequential order, these blocks may also be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 700 and other processes and methods disclosed herein, each block in FIG. 7 may represent circuitry that is wired to perform the specific logical functions in the process.

A user may have received one or more of NMDs 512, 514, 516 and connected the one or more NMDs to one or more networks or communication paths 542, 546. A NMD may be configured to integrate or interface with a media playback system (e.g., computing device 506, CR522, PBDs 532, 534, 536, 538). The NMDs may be included in a networked microphone system (e.g., NMDs 512, 514, 516, 504).

At block 702, to configure a NMD to interface or associate a NMD with a media playback system, a user may select on, for example, a control device (e.g., CR 522) to launch an application associated with the NMD or networked microphone system or the media playback system at block 702. The application may be an application to control features or settings of the networked microphone system and/or the media playback system. The networked microphone system may have one or more specialized add-on features available to provide added or enhanced functionality to the networked microphone system.

Figure 8A:
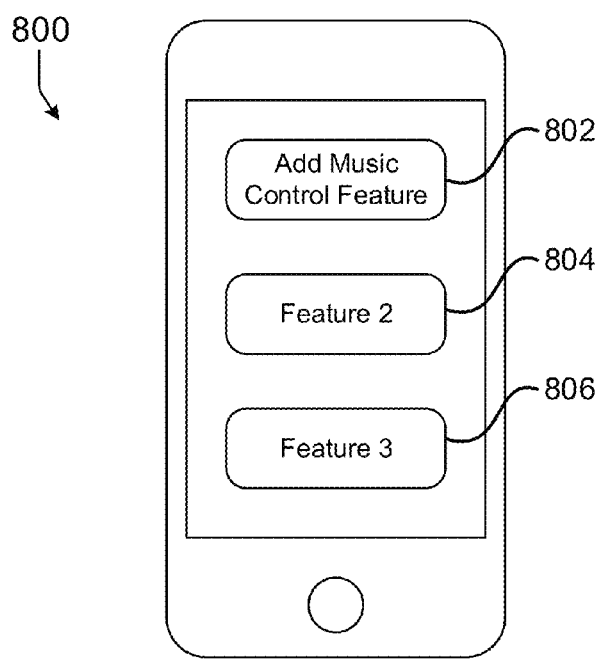
FIGS. 8A-8D show example user interfaces of a configuration process according to aspects described herein.
Figure 8B:
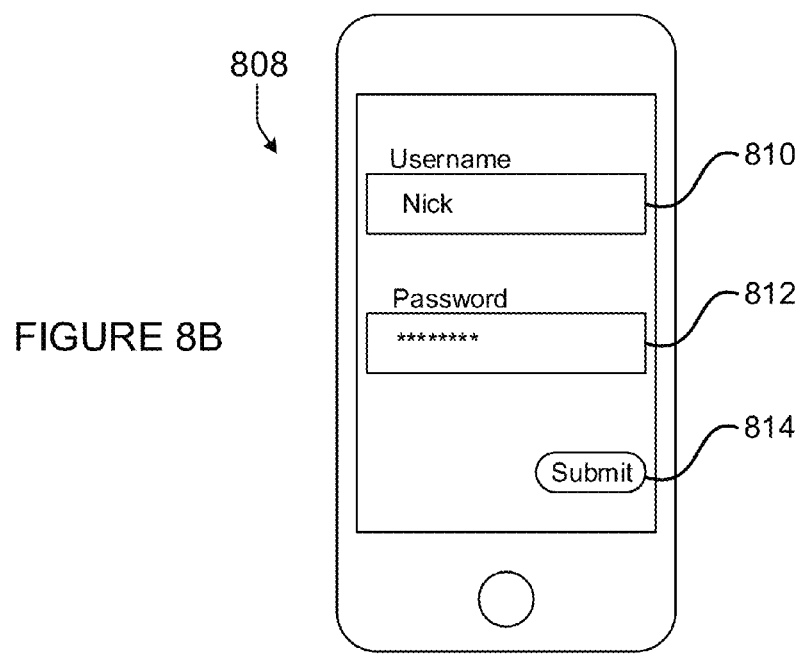

At block 704, available add-on features for the networked microphone system may be displayed for the user to select. An example user interface 800 is shown in FIG. 8A displaying available add-on features. The NMD may have one or more available add-on features 802, 804, 806. Feature 802 may be a music control feature which can, for example, control playback of the media playback system. At block 706, the control device may receive user input to add the music control feature or skill to the NMD. For example, the user may select to add the music control feature 802 by selecting feature 802. The music control feature 802 may be an application adding music control functionality or skills to the networked microphone system for the user. Upon selecting to add the music control feature 802, the display may change to show user interface 808 to prompt for account information from the user.

At block 708, a control device may receive account information for the music control feature via user interface 808 and input fields 810 and 812. The account information may be of an account that a user has with a media playback system and/or a music service. The account information may include a username and password of the account. The username may be entered in field 810, and the password may be inputted in field 812. The user may select a button such as a submit button 814 to submit the username and password for authentication with the media playback system (e.g., computing device 506) and/or music service (e.g., computing device 508). The account information may be transmitted via any of communication paths 542, 544, 546 and/or the metadata exchange channel for authentication at computing device 504, computing device 506, and/or computing device 508. Once authenticated, user information associated with the account may be transmitted from the media playback system to the networked microphone system. The user information may be custom names (e.g., custom zone names, custom playlist names, custom song names, custom album names, custom artist names, etc.), household identifier(s) associated with the user information, PBD identifier(s), and/or zone identifier(s). A custom name may be any name that is provided by the user. For example, a media playback system may provide a list of common zone names for the user to select from when naming a zone and/or give the user the option to type in a name of the zone. An interface of control device 300 may display the list of common zone names and/or display a field in which a user can enter a custom zone name via input (e.g., voice, text) received by the control device 300. Custom name information may be transmitted or shared with any device in system 500.

At block 710, a default zone (e.g., one or more playback devices) or default zones (e.g., at least two playback devices in different zones, group of at least two zones) may be determined for the NMD. The default zone or playback device(s) may be determined as described in Application No. 62/298,410 filed on Feb. 22, 2016 and entitled "Default Playback Device(s)." This application is hereby incorporated by reference in its entirety.

Figure 8C:
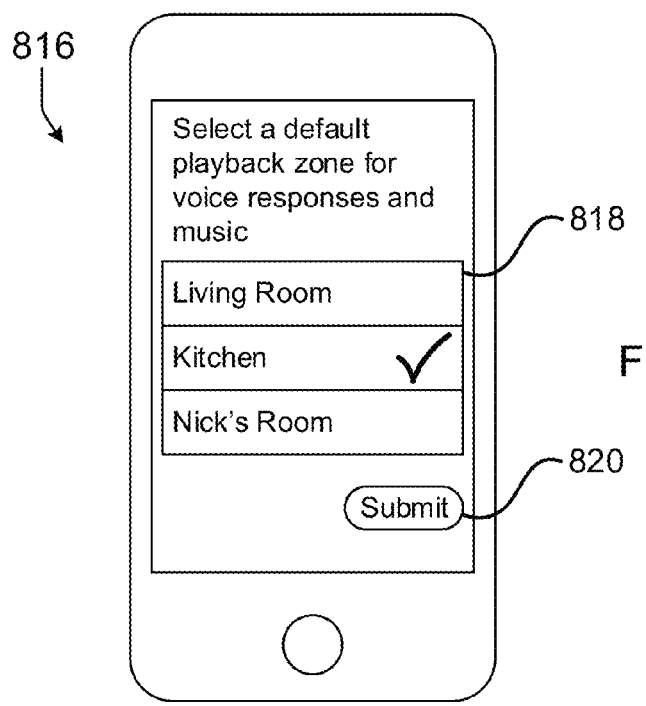
Figure 8D:
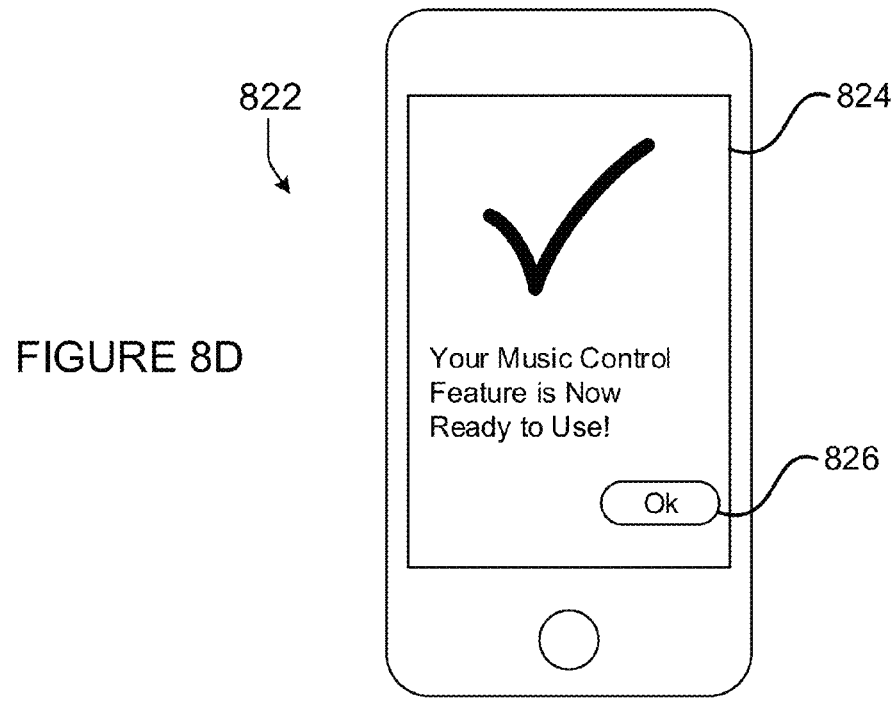

In some aspects, the user may specify the default zone during the initial configuration or setup. User interface 816 shown in FIG. 8C illustrates an example user interface which enables a user to select a default playback zone to associate with the NMD. User interface 816 may display a listing of available playback zones 818. The displayed names of available playback zones may include custom names associated with the user account entered at block 708. For example, the listing of available playback zones 818 may include the "Living Room" and "Kitchen" and the custom zone name of "Nick's Room." The displayed listings may be selectable to enable a user to specify the default zone(s) for playback of voice responses and/or music in response to commands received by the NMD or other control device. FIG. 8C shows the example of the user selecting the kitchen as the default zone. The user may select a button 820 such as a submit button to confirm selection of and submit the selection of the default zone. A confirmation screen 822 shown in FIG. 8D may be displayed to confirm to the user that the setup process is complete, and the user may select a button 826 to dismiss the confirmation screen 822.

At block 712, user-specific playback information may be sent to the networked microphone system from, for example, the media playback system. The user-specific information may be custom playback information such as custom zone names, custom playlists, and/or custom playlist names. In some aspects, the user-specific information and/or user account may be associated with a household identifier (HHI). The user-specific playback information may be transmitted from the media playback system (e.g., computing device 506, CR 522, PBD 532, PBD 534, PBD 536, and/or PBD 538) to the networked microphone system (e.g., computing device 504, NMD 512, NMD 514, and/or NMD 516), for example, via the metadata exchange channel and/or any other communication path between the media playback system and the networked microphone system.

Computing device 504 may store the custom playback information as dynamic variables which may be variables that can be dynamically associated with different variable types. For example, "Nick's Room" may be a custom zone name and may be stored as a dynamic variable that is associated with a zone variable type. As another example, "Nick's Faves" may be a custom playlist with a custom name created by the user. The name "Nick's Faves" may be stored as a dynamic variable and associated with a playlist variable type. In this manner, the networked microphone system may be aware of and can identify in the voice input custom information associated with the user.

The dynamic variables may be stored in a table or other data structure and dynamically associated with different variable types. For example, each dynamic variable may be associated with one or more variable types. The dynamic variables may be stored with identifiers associated with the user account. For example, the custom zone name of "Nick's Room" may be associated with a zone identifier of the media playback system and/or the identifier(s) of the PBD(s) in the "Nick's Room" zone. As another example, the custom zone name of "Nick's Room" may be stored with a zone identifier tag and/or the identifier(s) of the PBD(s) in the "Nick's Room" zone may be stored with a tag to the "Nick's Room" zone. The dynamic variables may be continuously, periodically, or aperiodically updated to include new custom names added or removed by the user or associated with the user's account. A custom name may be any name supplied by the user which may or might not already exist in a database.

In some aspects, each dynamic variable may be stored or associated with an identifier which may be used to identify the dynamic variable in a media playback system command. For example, the zone name "Nick's Room" may be stored with a zone identifier specific to the media playback system and when a command requests an action to be performed on the playback devices in "Nick's Room" the zone identifier for "Nick's Room" may be supplied in addition to or instead of "Nick's Room" with the media playback system command.

At block 714, a user can provide voice input by speaking a command or request which may be received by a NMD. The networked microphone system can convert the voice input from speech to text and parse the words to determine the syntax of the voice input. The spoken command may have a particular syntax which the networked microphone system can recognize as being in the area or domain of music playback control. For example, the user may say "play The Beatles in the Kitchen and Nick's Room." The networked microphone system may recognize the word "play" as a command which corresponds to an intent or directly as an intent that is associated with music playback and may identify the spoken command as in the area or domain of music playback control at block 716.

In another aspect, the presence or inclusion of one or more media variable instances and/or one or more zone variable instances may indicate that the command word "play" corresponds to the "play" intent. The networked microphone system may determine that "The Beatles" corresponds to a media variable instance by searching a music catalog which may include music metadata and determining that, for example, an artist is named "The Beatles." The networked microphone system may determine that "Kitchen" and/or "Nick's Room" correspond to zone names based on common zone names and/or dynamic variables associated with a zone variable type. The combination of the command word "play" with the media variable "The Beatles" and/or "Nick's Room" may enable the networked microphone system to determine that the voice input corresponds to the music control intent of playing requested music.

Because the spoken command is identified as being in the area or domain of music playback control, the networked microphone system may prioritize search results for music content related to "The Beatles" who are known artists and deprioritize or exclude search results for music content related to the homophone "the beetles" which might not be associated with any known artists. In other words, in response to identifying that the voice input is in the music domain, the set of words or vocabulary used for the speech-to-text recognition may be changed to be specific to the music domain which may include words not normally found in a dictionary and/or may be in a dictionary or a word in a language different from the spoken language.

For example, the set of words or vocabulary used for the speech-to-text recognition may be updated to include metadata information of media items (e.g., artist name, track name, album name, song name) in response to determining that the voice input is in the music domain. In some aspects, the voice input may include dictation of letters and/or symbols, for example, for custom names (e.g., zone, playlist), media variables, and/or names of artists, albums, and/or tracks. As another example, word(s) in the resulting text from the speech-to-text conversion may be changed to use media specific words prior to processing the music control command. The speech-to-text conversion for media variable instances may be use words found in music metadata, media catalogs, and/or custom or local media identifiers (e.g., playlist names, track names, album names, artist names etc.) in addition to or instead of standard words used by the networked microphone system. Similarly, the speech-to-text conversion for the zone variable may use custom zone names.

At block 718, the voice input containing a music control command may be processed. The networked microphone system may have various predefined syntaxes that may be associated with a user's intent (e.g., play, pause, adding to queue, grouping, other transport controls, controls available via the control device 300). Each intent may correspond to one or more media playback system commands which may or might not be the same as or similar to the intent. For instance, an intent of moving music playback from a first zone to a second zone may correspond to a media playback system command to move a now playing media item and/or the playback queue from the first zone to the second zone. In another example, the intent of moving music may correspond to a playback queue copy command for the media playback system to copy the playback queue of the first zone to the playback queue of the second zone and/or copy the state variable of the first zone to the state variable of the second zone.

As yet another example, the intent of moving music may correspond to two media playback system commands. The two commands may be to group the second zone with the first zone and then to remove the first zone from the group to in effect transfer the state of the first zone to the second zone.

A media playback system command may include an application program interface (API) which is called in response to determining that an intent corresponds to the media playback system command. The networked microphone system and/or the media playback system may have a defined mapping or correspondence between the intent of a user and a media playback system command.

In some aspects, the media playback system command may be executed on data stored in a computing device (e.g., computing device, 504, computing device 506, computing device 508) in cloud network 502. For example, an intent to add media item(s) (e.g., track(s), album(s), playlist(s)) to another playlist or playback queue may be added to a playlist or playback queue stored in cloud network 502. Playback queues stored on PBDs 532, 534, 536, 538 may be updated in response to the change in the playlist or playback queue stored in cloud network 502 so that the portion of the playback queue matches a portion or entirety of the playlist or playback queue in cloud network 502.

Certain words, syntaxes, and/or phrases may be associated with the same intent. For example, including the command word "play," "listen," or "hear" in a voice input may correspond to the user's intent that the media playback system play back media content. Each intent may have different types of predefined variables or slots on which to perform an action specified by the command or intent. The variables or slots may be in predefined locations or positions of various phrases. For example, the "play" command syntax may have a media variable for media that the user would like played back and may further have a location or zone variable for a location or zone in which the user would like the associated playback devices to playback the media content. In the example of the spoken command of "play The Beatles in the Kitchen," the instance of the media or music variable may be "The Beatles" and the instance of the zone variable may be the "Kitchen." The networked microphone system and/or media playback system may process the media variable separately and/or differently than the zone variable in identifying relevant objects which correspond to the media variable instance and/or the zone variable instance.

Another example of a syntax or phrase that may be associated with the "play" intent may be the syntax "Let me hear [media variable] [zone variable]." One example of this syntax may be "Let me hear Paul Simon in Emily's Room" where "Let me hear" may be associated with the "play" intent, "Paul Simon" may be an instance of the media variable, and "Emily's Room" may be an instance of the zone variable. The networked microphone system may parse the voice input and determine which of the syntaxes stored in the networked microphone system matches the voice input to identify the intent for the voice input. The syntaxes may be stored in any of the devices in the networked microphone system.

Yet another example of a syntax or phrase for the "play" intent or command may be the syntax "I want to listen to [media variable] in [zone variable]." The word "listen" or clause "I want to listen" may be associated with the "play" intent. Other syntaxes for the "play" intent are possible.

Another example command or intent may be related to adding media content to a queue which may be stored in the media playback system (e.g., in the PBD(s), the computing device 506, and/or CR 522). An example add-to-queue syntax may be "add [media variable] to queue in [zone variable]." Similar to other aspects described herein, the zone variable may be optional, and the system may determine the zone to which the command applies based on various techniques or methods (e.g., use the default zone, use the last-used zone, based on user presence information, use the zone actively playing media). The selected media content corresponding to the media variable may be added to the queue in the zone.

As yet another example command or intent may be a play next command which may cause a selected media content to be added to the top of a queue to be played next in a zone. An example syntax for this command may be to "play [media variable] next." Similar to other aspects described herein, the zone variable may be optional.

Another example of a command or intent may be a move or transfer command which may move or transfer currently playing music and/or the playback queue of a zone from one zone to another. For example, a user may speak the voice input of "Move music to [zone variable]" where the command word "move" or "transfer" may correspond to an intent to move playback state to another zone.

The commands and intents described herein are examples and other intents or commands are possible. For example, each of the controls available via control device 300 for controlling the media playback system as described herein may have corresponding intents available to be used to control the system. For instance, the name of the control command may correspond to an intent. If the control command involves one or more media items, the syntax for the command may include one or more media variables. If the control command involves one or more zones, the syntax for the command may include one or more zone variables. Other variables to be used with the different intents are also possible.

Examples of controls available via control device 300 for controlling the media playback system may include transport control commands. These commands or intents may be relevant to a media item which is currently being played such as transport commands (e.g., stop, pause, skip, rewind, fast forward, back, volume, etc.) or commands related to saving or adding the currently played media item to another playback queue or playlist. The syntax for intents or actions to be taken on a media item that is now playing may be simpler and may correspond to the names of the transport control. For example, the voice input for an intent to pause music playback may be the voice input "pause."

Different types of variables may be used in the different command syntaxes. For the media variable, the media variable may be a variable or slot in the syntax where the user is likely to specify via voice input media content that the user would like to hear or play. The media variable can be a variety of music related features or characteristics (e.g., types of media variables) including, but not limited to, album name, artist name, song name, playlist name, custom playlist name, genre (e.g., pop, classical, country, rock, R&B, etc.), mood (e.g., romantic, workout, productive), music tempo (e.g., upbeat, slow), radio station name, composer's name, musical era (e.g., baroque, romantic, classical, 20th Century), time period (e.g., 80's, 90's), playlist creator's name, ranking (e.g., best, Top 40) and/or other music identifying feature. The music variable may have a custom name that may be a custom playlist name created by the user of the user account and/or other custom name (e.g., custom song name, custom album name, custom artist name).

For the zone variable, the zone variable may be a variable or slot in the syntax where the user is likely to specify via voice input a location or zone in which to perform the requested action or the intent (e.g., play the requested music). A user may or might not include a zone instance in the voice input. In the event, the user does not specify a zone, for example, by simply saying "play some Beatles," the networked microphone system and/or media playback system may determine to "play some Beatles" in a default zone and/or other zone(s) based on other input (e.g., user presence information, context information, location information). The zone variable may include dynamic variables for custom zone names provided by the user. As another example, a custom zone name may be for example "Nick's Room" or "3rd Floor Conference Room."

In some aspects, the syntax may include a media service variable for a media service or application or other media-related service, product or application (e.g., media playback system) to execute the voice input. The system may identify a default playback system or zone(s) for all media related content or associate different playback systems or zone(s) with different services. For example, a user may say "play on Spotify Josh Groban in the bedroom." The system (e.g., networked microphone system and/or media playback system) may recognize "Spotify" as an instance of the media service variable, "Josh Groban" as an instance of a music variable, and "bedroom" as an instance of a zone variable. The system may search for media content related to "Josh Groban" as discussed herein within the media catalog of the media service Spotify®.

Some types of variables may be scalar in that the scalar variables may be formed into a vector or set which contains more than one instance of the same variable. A vector of a scalar variable may have the format or syntax when spoken by the user of "[first scalar variable] and [second scalar variable]," "[first scalar variable], [second scalar variable], and [third scalar variable]," or "[first scalar variable] [second scalar variable] [third scalar variable]." For example, a zone variable may be a scalar variable, and the user may specify that media content be played in more than one "Kitchen, Living Room, and Dining Room." In some aspects, a vector or a predefined set of scalar variables may be given a name. A predefined vector named, for example, "downstairs" may be associated with all of the zones which are downstairs in a home environment. In the example environment shown in FIG. 1, "downstairs" may be the "Living Room," "Dining Room," "Office," "Master Bedroom," "Bedroom," and "Bathroom" zones. The control device 300 can show a list of zones, and a user can select from the list of zones those zones to associate with the name or label "downstairs."

In some aspects, the media variable may be a scalar variable. More than one of the same type of music variable may be spoken in a single command phrase, and each media variable instance may be processed for corresponding media items independently of the other media variable instance(s) or in combination with the other media variable instance(s). For example, the voice input may be "Let's listen to music from The Beatles and the Beach Boys" which may correspond to the syntax "Let's listen to music from [first media variable] and [second media variable]." In one aspect, first media variable instance of "The Beatles" may be processed independently of "the Beach Boys." In independently processing "The Beatles" from "the Beach Boys," "The Beatles" may be processed for any media items related to the Beatles, and "the Beach Boys" may be processed for any media items related to "the Beach Boys" as will be described in more detail with respect to block 718. In another aspect, the first media variable instance of "The Beatles" and the second media variable instance of "the Beach Boys" may be processed as a combination where the system may process for media items related to both "The Beatles" and "the Beach Boys" (e.g., songs on which The Beatles and the Beach Boys perform and/or are listed as artists).

Networked microphone system and/or media playback system may associate a vector or set of zone variable instances with a grouping command. For example, the networked microphone system and/or media playback system may recognize the scalar variable syntax for the room variable and determine that this syntax corresponds to a media playback system command of grouping the specified instances of the zone variable. As an example, the user may specify to play media content in the "Living Room, Kitchen, and Nick's Room." The system 500 (e.g., networked microphone system and/or media playback system) may recognize "Nick's Room" as a zone variable based on location or placement of where "Nick's Room" is spoken in the phrase and search the table storing dynamic variables for custom zone names corresponding to "Nick's Room." The searching may be performed by the computing device 504 and/or computing device 506, and the custom zone name and/or identifier may be transmitted between the computing device 504 and computing device 506 based on the search of the table. The transmission may be via the metadata exchange channel and/or any other communication path between the computing device 504 and computing device 506.

Another example of a syntax which may be recognized as a grouping command by the media playback system may be to "add [zone variable]" or "also play in [zone variable]." For example, the networked microphone system may recognize the word "add" or the phrase "also play" as corresponding to a grouping intent or command. The system may determine the intent solely based on the voice input including the command word of "add" or "also play" in the command word position of the syntax or based on the voice input including the command word and a zone variable instance. This type of grouping may be based on context such as the context of which zones the music is already playing in. The media playback system may send this information to the networked microphone system via any communication path and/or the metadata exchange channel. In some aspects, the media playback system may receive the information and understand to also play the music currently being played in one or more zones in the specified zone and/or to include the specified zone in an existing group.

In some aspects, the music variable can be a scalar variable. For example, the user can specify to "play Backstreet Boys music from the 90's." "Backstreet Boys" may be the name of an artist and "the 90's" may be a time period for the music. Another example may be "play American Pie by Madonna" where "American Pie" may be a track name and "Madonna" may be an artist's name.

The music variable may be processed by searching a music database for information related to the specific music variable. The database may be a database of music at computing device 504, computing device 506, and/or computing device 508. For example, the user may speak "play American Pie." The networked microphone system may search computing device 504 for any music information related to "American Pie." The computing device 504 may return the results of, for example, an artist who has an album named the same as the music variable, the album name which matches or is similar to the music variable, a track named the music variable, a radio station of the music variable, a playlist named the music variable, a streaming service provider identifier of content related to the music variable and/or the raw speech-to-text conversion results. Using the example of "American Pie," the search results may return the artist "Don McLean," the album(s) named "American Pie," track(s) named "American Pie," radio station(s) named "American Pie" (e.g., identifier for Pandora radio station for "American Pie"), a music service (e.g., streaming music service such as Spotify® or Pandora®) track identifier for the track "American Pie" (e.g., Spotify® track identifier for "American Pie", URI, and/or URL) and/or the raw speech-to-text result of "American Pie." The networked microphone system may provide the set of results from the database search to the media playback system. The results may be provided via the metadata exchange channel and/or any other communication path established between the networked microphone system and the media playback system.

In some aspects, the spoken command may specify the specific media content (e.g., song, artist) or set of media content (e.g., album) to play such as "play the American Pie album" in which case the search results may return the album named "American Pie" and identifiers of music services for the album named "American Pie."

As another example, the user may speak the command "play foofoo" where the music variable is "foofoo." "Foofoo" might not correspond to any musical features or characteristics, and as a result, the database might not have any artist, album and/or track which corresponds to the music variable "foofoo." In this example, the returned result may only be the result of the speech-to-text conversion of "foofoo." The speech-to-text conversion or raw text may be used to search custom names (e.g., custom album name, custom song name, custom artist name). The raw text may be used to search for content stored on a device (e.g., CR 522) or on a network-enabled storage device (e.g., network attached storage (NAS) device). The network-enabled storage device may be able to communicate with the media playback system and/or networked microphone system via communication paths 542, 544, 546. In some instances, custom content may be stored by the user on computing device 508. The contents in the network-enabled storage device may be indexed on any device in system 500 and may be searchable based on the raw text.

As yet another example, the user may speak the command "play Beatles." Outside of a musical context "Beatles" may be interpreted to correspond to "beetles" because these words are homophones. Since the spoken command may be identified as in the area of music control in block 716, the networked microphone system may aware that in the spoken command "play Beatles" "Beatles" likely corresponds to the artist or other musical content named "Beatles." The search of the database may produce the results of the artist The Beatles, artist identifiers for The Beatles for different streaming services, an identifier for a recommended playlist based on the artist The Beatles and/or the raw results of the speech-to-text conversion of the utterance "Beatles."

As another example, the voice input spoken by the user may be "play Jazz." The system 500 may identify "Jazz" as a genre based on a search of a database storing a listing of genres. The system may search for relevant media content which corresponds to the genre of jazz. The search results may, for example, be identifiers for the genre "Jazz" in databases of various music services and/or playlist name(s) or identifier(s) of playlist(s) which correspond to the genre "Jazz."

In some aspects, the voice input may include two commands or phrases which are spoken in sequence. The networked microphone system may recognize that the two commands that are spoken in sequence may be related. The first command may contain a first variable type and the second command may contain a subset of the first variable type. For example, the user may provide the voice input "play some classical music" followed by "play something romantic." There may be a pause between the two commands. The system 500 may have eras of classical music associated with a classical instance of the music variable. The system 500 may recognize that "romantic" refers to the romantic era of classical music and may process the command as being a command to play something from the romantic era rather than to play something of a romantic mood. As another example, the user may speak "play some *NSync" followed by a short pause and then "play No Strings Attached." The system 500 may recognize that "No Strings Attached" is an album by the artist *NSync and may play this album rather than an album named "No Strings Attached" by another artist.

In some aspects, the command may include a system name variable for the name of a media playback system. The media playback system may be associated with a name such as the name of the media playback system manufacturer (e.g., SONOS®), a custom name, and/or other name. The voice input may include the name of the system to identify a specific system associated with the user account on which to execute the command or intent. In some instances, the presence of a media playback system name variable in the spoken command may be used in block 716 to automatically identify the voice input as being in the area of music control.

At block 720, the media playback system may execute the spoken music control command by executing each of the parsed commands and variable(s). The media playback system may receive the search results from the networked microphone system and/or one or more media playback system commands. The media playback system commands and/or media information (e.g., search results) may be received by the media playback system in one or more messages from the networked microphone system. Based on the search results, the media playback system (e.g., computing device 506, control device 522, and/or playback device 532, 534, 536, 538) may decide what media content to play or queue for playback in response to the spoken command. Various techniques may be used to determine what to play in response to the spoken command when search results in addition to the raw text-to-speech conversion is received.

In some aspects, the media playback system may weight the different results based on a variety of data points and/or preferences. For example, the weighting of the different results may be based on any of popularity, user playback history, music services associated with the user account, music services available to the media playback system, music stored on storage devices associated with the media playback system and/or user preferences. As an example, songs by different artists may have the same name. If the search result returns songs with the same name by different artists, the song that is more popular may be weighted more and/or selected. The popularity of a song may be determined based on a variety of sources such as user play count, radio play count, music chart ranking, copies sold, and/or other available data. As another example, the media items which have been recently played by the user may be weighted more heavily.

In some aspects, the user may indicate for a media variable a preference order for media items to select. For example, the user may indicate that custom playlists are most preferred followed by a radio station, curated playlist, track, album, artist. The system may give more weight to media variable types that are higher in priority based on the user's preferences. The user's preferences may be stored in a user profile and/or otherwise associated with the user's account such that the user's preferences may be transmitted to the networked microphone system and/or media playback system. Some media variable types may be given equal priority or weighting.

In some aspects, a default prioritization may be used if the user has not provided user preferences. The system may use any combination of priorities for the different media variable types. For example, the system may prioritize media content corresponding to an album followed by artist and track ahead of the results corresponding to the raw text.

As another example, the media variable instance may be the name of an artist, and the artist may correspond to a playlist and a radio station. For media variable instances, playing of the radio station may be preferred over the playlist.

As yet another example, the media playback system may filter out results associated with a music service to which the user and/or the media playback system does not have access. After filtering out inaccessible results, the media playback system may select the media content to play based various methods or techniques described herein.

The selection methods described herein are illustrative, and other examples of methods or techniques for selecting media item(s) to play in response to a "play" command may be used.

In response to selecting the content to play in response to receiving a "play" command or intent, the media playback system may use the identifiers and/or other identifying information provided from the search results to identify a source for the content. The identifiers may be a network address or link where the corresponding content can be retrieved by the media playback system such as a network storage location or uniform resource locator (URL) and/or metadata (e.g., artist name, album name, track number, radio station name, playlist name, media service name, etc.).

In some aspects, the command or intent may be a transport command (e.g., pause, play after pause, skip, back, rewind, fast forward). As discussed above, the system 500 may determine a media playback system command which corresponds to the command or intent and execute the corresponding media playback system command. The networked microphone system can cause the media playback system to execute the command by transmitting a message to the media playback system including command information identifying the command corresponding to the intent (e.g., play, pause, etc.) and relevant objects of the command (e.g., variables such as zone name, zone identifier, group identifier, media identifier etc.). For example, the transport command may include an instance of a zone variable (e.g., Nick's Room, Kitchen, or other identifier for the zone) for the zone in which the command is to be executed.

In response to causing an action on the PBD(s) based on the voice input, the media playback system may update and/or store the state information relating to the actions performed by the PBD(s). For example, the PBD(s) may update the state variable to indicate the state of the zone such as that the zone or specific playback device(s) are currently playing a particular media item and/or a particular media item was added to the queue stored on the PBD(s). The state variable may be accessed by any device in system 500 in order to enable seamless playback and/or control from various devices in the system 500.

While the methods and systems have been described herein with respect to media content (e.g., music content, video content), the methods and systems described herein may be applied to a variety of content which may have associated audio that can be played by a media playback system. For example, pre-recorded sounds which might not be part of a music catalog may be played in response to a voice input. One example is the voice input "what does a nightingale sound like?". The networked microphone system's response to this voice input might not be music content with an identifier and may instead be a short audio clip. The media playback system may receive information associated with playing back the short audio clip (e.g., storage address, link, URL, file) and a media playback system command to play the short audio clip. Other examples are possible including podcasts, news clips, notification sounds, alarms, etc.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method, comprising:
   receiving, via a computing device, a voice input comprising a command word, one or more media variable instances, and one or more zone variable instances;
   determining, via the computing device, (i) a media playback system command corresponding to the command word and (ii) an intent to form a zone group based on the one or more zone variable instances, wherein the zone group comprise a first playback zone and a second playback zone that is not a member of the zone group before receiving the voice input;
   identifying, via the computing device, media content corresponding to the one or more media variable instances; and
   causing, via the computing device, the media playback system to (i) form the zone group and (ii) execute the media playback system command on the media content via the zone group.

2. The method of claim 1, further comprising:
   before determining that the media playback system command corresponds to the command word, determining, via the computing device, that the voice input corresponds to music control, and
   wherein determining that the media playback system command corresponds to the command word comprises:
      determining the media playback system command based on available commands corresponding to music control.

3. The method of claim 1, further comprising:
   determining, via the computing device, one or more media items from the identified media content; and
   transmitting, via the computing device, an identifier indicating a network storage location of the one or more media items.

4. The method of claim 1, wherein the determining comprises:
   identifying, via the computing device, the command word as being in a first position in the voice input;
   identifying, via the computing device, the one or more media variable instances as being in a second position in the voice input; and
   identifying, via the computing device, the one or more zone variable instances as being in a third position in the voice input.

5. The method of claim 1, wherein the determining comprises identifying, via the computing device, a first zone variable, a second zone variable, and a position of the first zone variable relative to a position of the second zone variable in the voice input, wherein the first zone variable instance corresponds to the first playback zone, and wherein the second zone variable instance corresponds to the second playback zone.

6. The method of claim 1, wherein receiving the voice input comprises:
   receiving the voice input comprising the command word, the one or more media variable instances, and one or more zone variable instances, wherein the one or more zone variable instances comprise a first zone variable corresponding to the first playback zone and a second zone variable corresponding to the second playback zone.

7. The method of claim 1, wherein causing the media playback system to execute the media playback system command on the media content comprises:
   transmitting, via the computing device to the media playback system, a message comprising command information identifying the media playback system command, media information identifying media content corresponding to the one or more media variable instances, and one or more zone identifiers corresponding to the one or more zone variable instances.

8. A tangible, non-transitory computer-readable medium storing instructions, that when executed by one or more processors of a computing device, cause the computing device to perform functions comprising:
receiving a voice input comprising a command word, one or more media variable instances, and one or more zone variable instances;
determining (i) a media playback system command corresponding to the command word and (ii) an intent to form a zone group based on the one or more zone variable instances, wherein the zone group comprise a first playback zone and a second playback zone that is not a member of the zone group before receiving the voice input;
identifying media content corresponding to the one or more media variable instances; and
causing the media playback system to (i) form the zone group and (ii) execute the media playback system command on the media content via the zone group.

9. The computer-readable medium of claim 8, wherein the functions further comprise:
before determining that the media playback system command corresponds to the command word, determining that the voice input corresponds to music control, and
wherein determining that the media playback system command corresponds to the command word comprises:
determining the media playback system command based on available commands corresponding to music control.

10. The computer-readable medium of claim 8, wherein the functions further comprise:
determining one or more media items from the identified media content; and
transmitting an identifier indicating a network storage location of the one or more media items.

11. The computer-readable medium of claim 8, wherein the functions further comprise:
identifying the command word as being in a first position in the voice input;
identifying the one or more media variable instances as being in a second position in the voice input; and
identifying the one or more zone variable instances as being in a third position in the voice input.

12. The computer-readable medium of claim 8, wherein the determining comprises identifying, via the computing device, a first zone variable, a second zone variable, and a position of the first zone variable relative to a position of the second zone variable in the voice input, wherein the first zone variable instance corresponds to the first playback zone, and wherein the second zone variable instance corresponds to the second playback zone.

13. The computer-readable medium of claim 8, wherein receiving the voice input comprises:
receiving the voice input comprising the command word, the one or more media variable instances, and one or more zone variable instances, wherein the one or more zone variable comprise a first zone variable corresponding to the first playback zone and a second zone variable corresponding to the second playback zone.

14. The computer-readable medium of claim 8, wherein causing the media playback system to execute the media playback system command on the media content comprises:
transmitting, to the media playback system, a message comprising command information identifying the media playback system command, media information identifying media content corresponding to the one or more media variable instances, and one or more zone identifiers corresponding to the one or more zone variable instances.

15. A computing device, comprising:
one or more processors;
memory storing instructions that when executed by the one or more processors cause the computing device to perform functions comprising:
receiving a voice input comprising a command word, one or more media variable instances, and one or more zone variable instances;
determining (i) a media playback system command corresponding to the command word and (ii) an intent to form a zone group based on the one or more zone variable instances, wherein the zone group comprise a first playback zone and a second playback zone that is not a member of the zone group before receiving the voice input;
identifying media content corresponding to the one or more media variable instances; and
causing the media playback system to (i) form the zone group and (ii) execute the media playback system command on the media content via the zone group.

16. The computing device of claim 15, wherein the functions further comprise:
before determining that the media playback system command corresponds to the command word, determining that the voice input corresponds to music control, and
wherein determining that the media playback system command corresponds to the command word comprises:
determining the media playback system command based on available commands corresponding to music control.

17. The computing device of claim 15, wherein the functions further comprise:
determining one or more media items from the identified media content; and
transmitting an identifier indicating a network storage location of the one or more media items.

18. The computing device of claim 15, wherein the functions further comprise:
identifying the command word as being in a first position in the voice input;
identifying the one or more media variable instances as being in a second position in the voice input; and
identifying the one or more zone variable instances as being in a third position in the voice input.

19. The computing device of claim 15, wherein the determining comprises identifying, via the computing device, a first zone variable, a second zone variable, and a position of the first zone variable relative to a position of the second zone variable in the voice input, wherein the first zone variable instance corresponds to the first playback zone, and wherein the second zone variable instance corresponds to the second playback zone.

20. The computing device of claim 15, wherein causing the media playback system to execute the media playback system command on the media content comprises:

transmitting, to the media playback system, a message comprising command information identifying the media playback system command, media information identifying media content corresponding to the one or more media variable instances, and one or more zone identifiers corresponding to the one or more zone variable instances.

* * * * *